July 25, 1972    J. F. JAMMET    3,679,489
PROCESS FOR MASS PRODUCTION OF BATTERIES OF ELECTROCHEMICAL
GENERATORS OF STACKED FLAT CONSTITUENTS
Original Filed Dec. 26, 1968    4 Sheets-Sheet 1

INVENTOR
JEAN FIRMIN JAMMET
BY
ATTORNEYS

FIG. 4
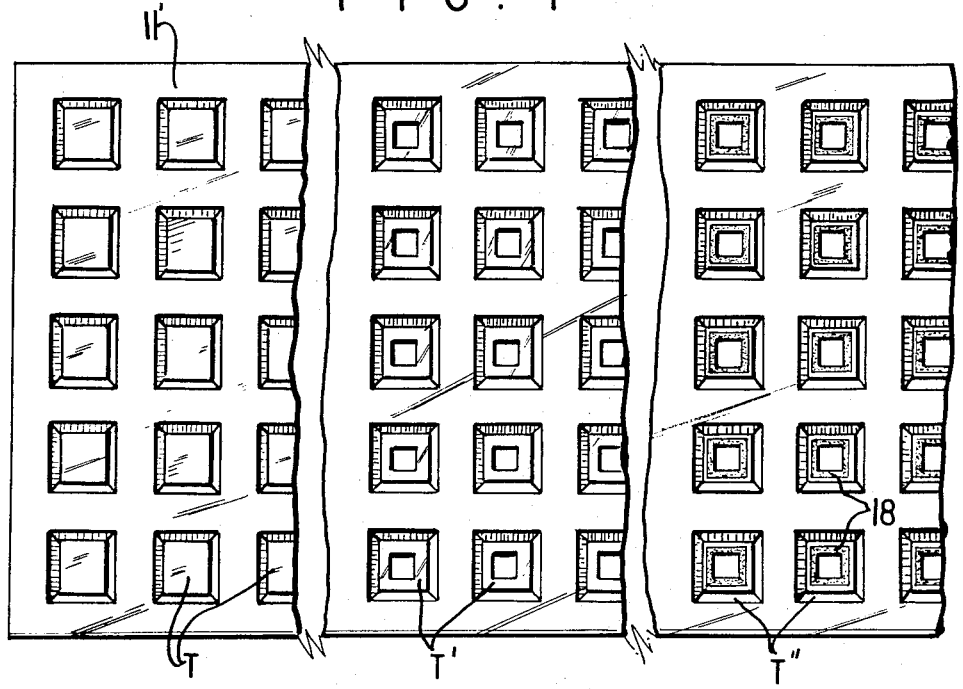
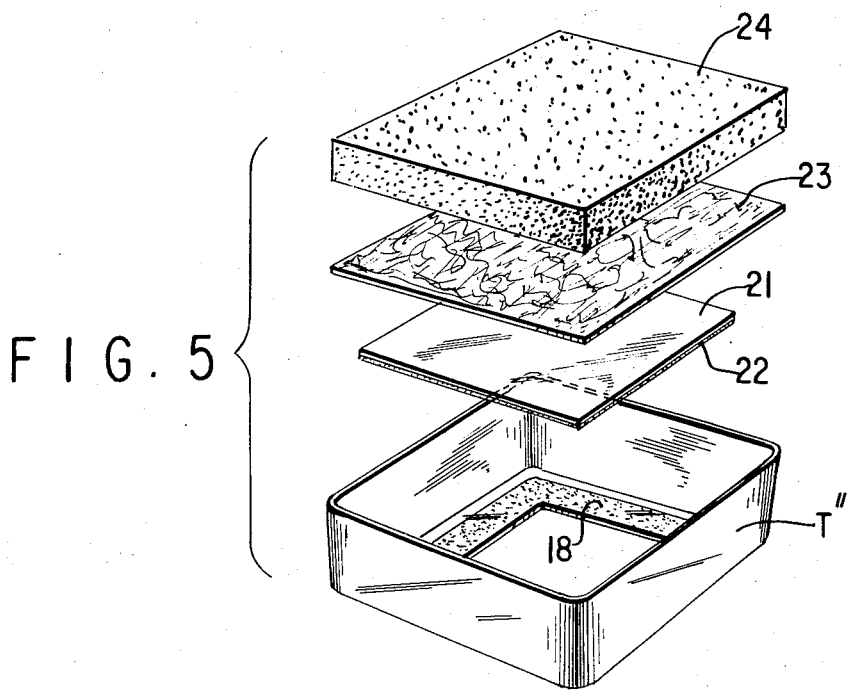
FIG. 5
INVENTOR
JEAN FIRMIN JAMMET
BY
ATTORNEYS

July 25, 1972   J. F. JAMMET   3,679,489
PROCESS FOR MASS PRODUCTION OF BATTERIES OF ELECTROCHEMICAL
GENERATORS OF STACKED FLAT CONSTITUENTS
Original Filed Dec. 26, 1968   4 Sheets-Sheet 3

INVENTOR
JEAN FIRMIN JAMMET
BY
ATTORNEYS

July 25, 1972  J. F. JAMMET  3,679,489
PROCESS FOR MASS PRODUCTION OF BATTERIES OF ELECTROCHEMICAL
GENERATORS OF STACKED FLAT CONSTITUENTS
Original Filed Dec. 26, 1968  4 Sheets-Sheet 4
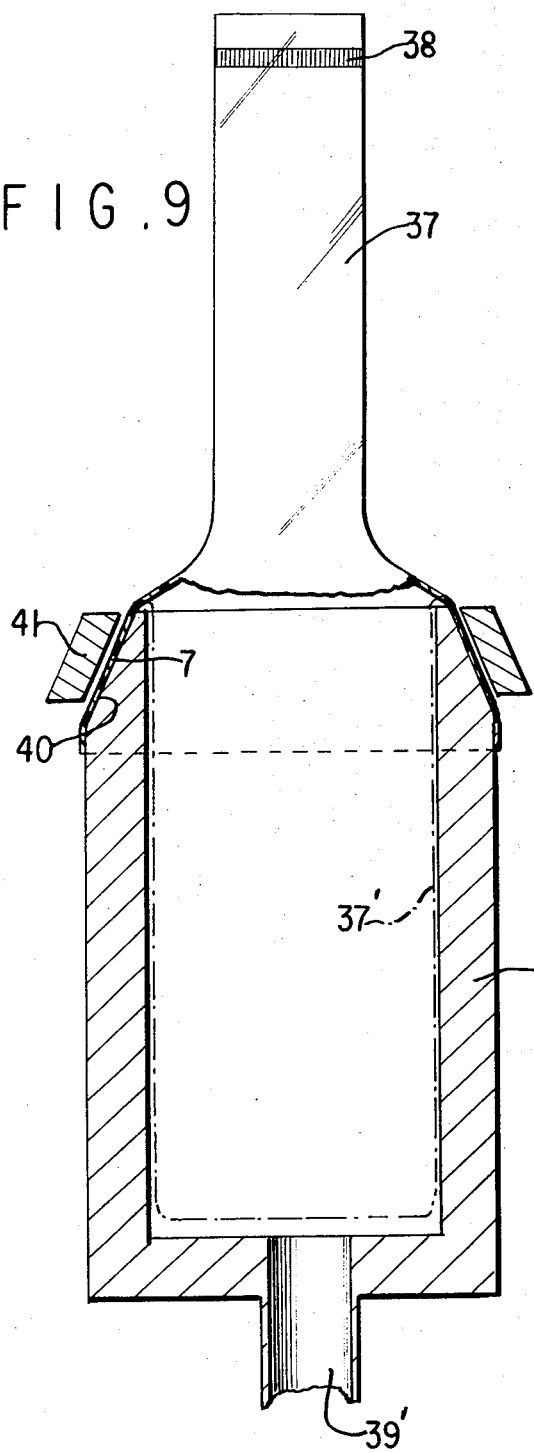
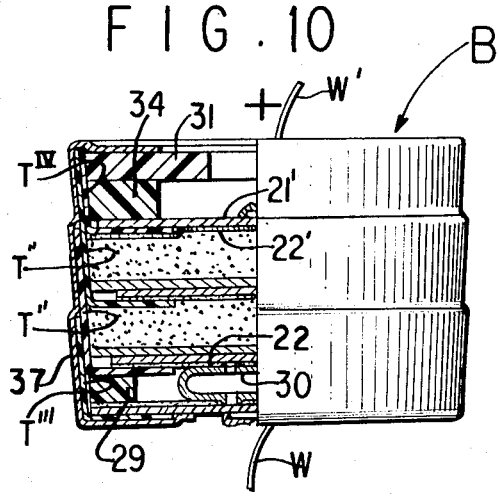
INVENTOR
JEAN FIRMIN JAMMET
BY
ATTORNEYS

United States Patent Office 3,679,489
Patented July 25, 1972

3,679,489
PROCESS FOR MASS PRODUCTION OF BATTERIES OF ELECTROCHEMICAL GENERATORS OF STACKED FLAT CONSTITUENTS
Jean Firmin Jammet, Poitiers, France, assignor to Societe des Accumulateurs Fixes et de Traction (Societe Anonyme), Romainville, France
Continuation of abandoned application Ser. No. 786,990, Dec. 26, 1968. This application Aug. 5, 1971, Ser. No. 169,472
Int. Cl. H01m 31/00
U.S. Cl. 136—175
12 Claims

ABSTRACT OF THE DISCLOSURE

Batteries are mass produced by initial formation from plastic material of trays of substantially inverted truncated pyramidic form. These formed trays are perforated at their bottoms and have adhesive applied around the openings on internal bottom faces of the trays. Then, the perforated trays have mounted therein successively a negative duplex electrode, for example, of zinc whose lower face is covered with a conductive coating, the superposed separator impregnated with electrolyte lying over the upper face of the electrode and a depolarizer positive active material is superposed over each separator. The filled trays are severed and nested successively. Then, respective positive and negative contact terminals are applied at the opposite ends of the battery assembly. Thereafter, the so-formed battery assembly is mounted in stretched outer sheath of extensible plastic material.

This application is a continuation of application Ser. No. 786,990, filed Dec. 26, 1968, now abandoned.

RELATED APPLICATIONS

A related application Ser. No. 786,989, filed Dec. 26, 1968, now U.S. Pat. No. 3,597,276 by the same inventor entitled Batteries With Flat Cells is copending.

BRIEF SUMMARY OF INVENTION

The present invention relates to batteries of electrochemical generators made up of flat constituents piled up in trays which are themselves stacked and nested in each other and then compressed together with special compressive external sheating also provided to enhance and maintain the compressed condition of the constituents and trays both axially and laterally.

Generators comprising flat constituents piled in a stacked plastic tray each having a perforated bottom are already known. Thus, beginning with the lowermost tray, the following components are successively found therein and in successive upper trays:

a duplex negative electrode constituted by a zinc plate having all its lower face coated with a conductive layer,
a separator thereover impregnated with electrolyte,
a depolarizer positive-electrode mix are provided.

The bottom of each of the trays is perforated so that, when the trays are stacked and nested, a conductive layer adhering to each negative electrode will be in contact with the mix of the next preceding cell, resulting a series-connecting of the successive cells.

Previously, such stack of trays have generally been sheathed by paper having one metallized face outwardly and the other face adjacent the trays coated with melted pitch.

The automation of such procedure, which is the only way to obtain products of a uniform quality at a reasonable cost involves many complex problems. These have been partially solved by the procedure disclosed in the French Pat. No. 1,252,174, filed Dec. 17, 1959 (no corresponding foreign applications).

This patent describes a process comprising mainly the following steps:

forming plastic trays from a strip used as a conveyor during further manufacturing steps. Forming is to be taken as an operation permitting shaping of previously heated plastic strip to the contour of bosses having dimensions corresponding to that of the desired trays;
perforating the center portions of the bottoms of the shaped trays to provide apertures or openings therein;
coating the peripheral portions about said aperture internally of the tray bottoms with an adhesive;
inserting the required flat constituents of the cell into the trays while still attached to the strip from which they have been formed;
separating the formed and perforated trays from the strip by cutting off or severing;
stacking the severed trays in required number for a desired battery;
applying the required terminals at opposite ends of the battery and then compressing the stack and alternately sheathing the battery.

It must be noted that all constituents of each cell must be suitably compressed and maintained in this state when the trays of the constituent filled cells have been stacked and nested in each other so that the internal resistance of the battery will not have too high a value that would be prejudicial to good operation. This condition is not fully established in the above-mentioned patent since the compression exerted is global and does not distribute itself uniformly throughout the stacking.

The present invention has, among its objects and features, avoidance of the above-mentioned drawbacks and contemplates provision of improvements to this above-described process in order to increase production quality and manufacturing speed while making it easier in practice.

The process of the present invention can be used for producing any type of electrochemical generator embodying flat constituents, wherein all said constituents are respectively piled into superposed nested trays. It will, however, be described particularly with respect to batteries of dry cells filled with flat constituents respectively piled into superposed nested trays.

The invention more specifically thus relates to a battery of electrochemical generators comprising flat constituents wherein the said flat constituents are respectively piled up in successive trays which are themselves stacked and nested in each other and then compressed, characterized by the fact that the battery thus assembled is additionally contained in an outer plastic extensible sheath which has been contracted after insertion into it of the battery and is submitted by the contraction to axial as well as radial compression, this compression being practically uniform from one cell to the other in the entire height of the battery, the dimensions of the said sheath, prior to stretching and mounting, being inferior to that of the battery.

The advantage of such an external sheath is that the piled or stacked generators are each submitted to individual compression.

According to a feature or characteristic of the invention, the stacked battery is introduced at first into the plastic sheath which is overstretched to permit the said introduction, then the overstretching is released so that the sheath contracts and compresses the battery, its ends folding themselves over both ends of said battery, thus providing axial as well as lateral compression.

According to another feature and characteristic of the invention after releasing the sheath to permit the introduction of the battery, the sheath is further contracted, for instance, by a deplastification obtained by an appropriate solvent applied preferably to the sheath prior to its overstretching.

According to the invention, prior to introduction into said plastic sheath, the battery can be coated externally with several layers of wax or paraffin on its side walls and on the external parts of both ends, in order to finish sealing off between its individual stacked cells.

Other objects and features of the invention will appear from the following detailed description, together with the accompanying drawings in which:

FIG. 4 is a top view of several portions of a strip from which the tray is formed corresponding to the three steps diagrammatically shown in FIGS. 1 to 3;

FIG. 5 is an exploded perspective view of one of the cells constituting the battery;

FIG. 9 diagrammatically illustrates a device for rapidly applying external shrinkable sheaths, and FIG. 10 is a partially sectionalized view of a completed battery.

DETAILED DESCRIPTION

Figure 1:
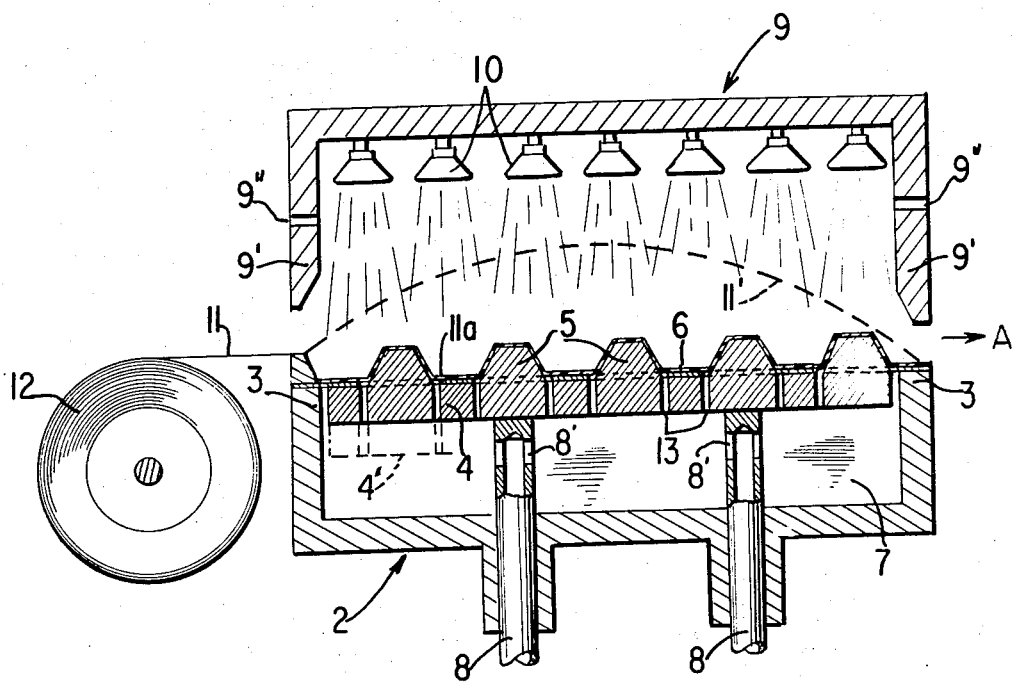
FIG. 1 is a diagrammatic cross-section of an apparatus that may be used for manufacturing batteries according to the invention.

In FIG. 1, the tray forming apparatus comprises:

A fixed hollow body 2 bordered by a frame 3, wherein a plate 4 provided with bosses such as 5, whose external dimensions correspond to the internal dimensions of the trays to be formed is movable reciprocally. A fixed screen 6, having apertures through which the said bosses 5 can pass spans the body 2, being appropriately supported by the frame 3.

The bosses 5 are shaped in conformity with the desired taper of the corresponding trays to be formed. This taper has been intentionally exaggerated in the figures to facilitate understanding of the manufacturing process.

A chamber 7 is provided in body 2 beneath the plate 4 into which either vacuum can be created or else compressed air can be injected, for example, as illustrated by the hollow pistons 8 extending from the plate 4 and which may serve for moving the plate 4 carrying the bosses 5. These hollow pistons may have either vacuum or compressed air directed therethrough from suitable sources and communicate with chamber 7 via passages 8'.

A movable hollow body 9 bordered by a frame 9' having the dimensions of the frame edge 3 with corresponding shape, in which heating elements such as infra-red lamps 10, for example, are fixed is mounted movably over body 2. It is provided in its frame edge 9' with vent passages 9".

Tray forming with the described apparatus proceeds as follows:

A length 11 of the plastic strip is unwound intermittently from a reel 12 of such strip and is moved into place between the two bodies 2 and 9 so that when the body 9 is lowered downwardly, a stretched length 11 of the strip is clamped between upper edges of the lower bordering frame 3 and the lower edges of the upper frame 9' in practically air-tight locking relationship. Advantageously, as seen in the figure, the upper edge of the frame 3 at the outlet side for the strip 11, right side in FIG. 1, is lower than the other portions of the upper edge of said frame 3, so that the strip length can be moved readily into position.

According to the French Pat. No. 1,252,174, describing a process for forming, vacuum is created in the chamber 7 and it is sufficient to press onto the upper surfaces of the bosses 5 the square portion of the length 11 of the plastic sheet that is locked between the frames 3 and 9. It is softened now by heating supplied by lamp 10 to its upper side. This technique does not yield satisfactory results with all plastic materials, being, for example, good with polystyrene but not with polyvinyl chloride plastic.

According to the invention, when the length 11 of the sheet which has been locked between the frames 3 and 9 has been heated by lamps 10, the sheet is stretched by injecting a fluid, such as air, for example, with the necessary pressure into chamber 7 via passage 8' to blow up the softened length 11 of the plastic sheet to the position shown by the dotted line 11'. Afterwards, the heated stretched plastic sheet length 11 will be able to conform perfectly well to the shape of the bosses, for example, by creating vacuum in the chamber 7 via passages 8'.

During this last vacuum step, the plastic sheet length 11 is no longer heated.

Such a vacuum formation of this length 11' to initial tray conforming shape on bosses 5 is of very good quality, providing a practically constant wall thickness in the formed trays of plastic sheet length 11' and smooth surfaces.

It should be noted that the screen 6 is very favorable to this formation because it permits localizing the action of vacuum transmitted through channels 13 defined in plate 4 defined about the peripheries of the bosses 5, i.e. at the zones where the last part of the formation of the plastic material occurs.

When tray formation has been finished the body 9 is elevated and at the same time air can be blown over the upper surface of the tray formed sheet length for cooling and hardening or setting. The tray formed sheet 11' is then automatically disengaged from the bosses 5 by lowering the plate 4 downwardly to the position shown by dotted outline 4'. It is to be noted that thereby since the right edge of the frame 2 is at the level of the screen 6, the tray formed strip length 11 are readily moved in the direction of arrow A at a determined pace by applying only a slight pulling force, for example. The flat portion 11a of the formed length 11' then arrives at the right end of the screen 6 and the body 9 is again lowered onto body 2 so that tray forming operation can be repeated on the next length 11 of strip, the device being designed to operate intermittently so that the tray formation can succeed longitudinally at regular intermittent intervals on successive lengths of strip drawn from reel 12 as is shown in FIG. 4 where the formed trays T in strip length 11' (openings towards the observer) each have the shape of regular truncated pyramids.

The strip 11 is moved intermittently through the forming apparatus thus far described and in the depicted example each intermittent movement provided for the simultaneous production of 25 trays T at a time.

At the outlet side of the forming device so far described, the strip lengths 11' bearing the formed trays T therein opening originally downward, is inverted or turned upside down opening upwardly so as to cut or punch out and remove the bottom center portions of each tray T to provide trays T'.

Figure 2:
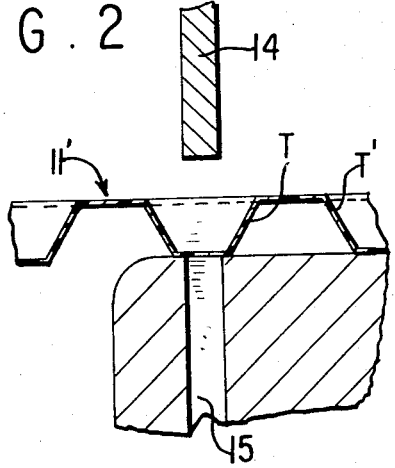
FIG. 2 shows similarly a part of the apparatus, particularly for perforating the bottoms of the trays.

A punching out mechanism for such purposes is shown in FIG. 2 which is a partial diagrammatic view of the perforating or punching out device. It comprises a plurality of punches such as 14 of a substantially square cross-section and corresponding underlying dies 15. This device is preferably designed to perforate the trays at the tray formation speed so that production can proceed substantially continuously. The result appears in FIG. 4 where reference number T' designates perforated trays whose bottoms have been perforated by punches 14 and dies 15.

Figure 3:
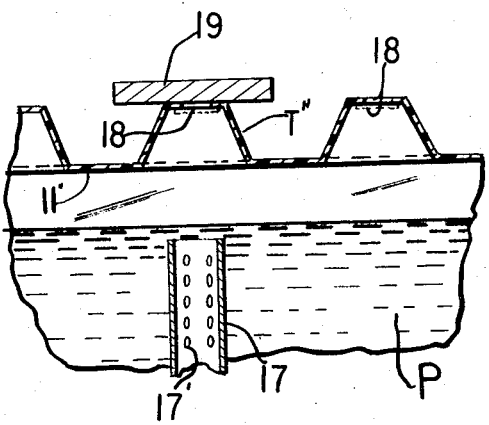
FIG. 3 shows similarly a part of the apparatus used for coating the bottoms of the trays.

Beyond discharge end of the perforating or punching out device, the strip length bearing perforated trays T' is again turned upside down and trays move forwards intermittently to another successive position illustrated in FIG. 3 where an approximately square-shaped hollow plug 17 with openings such as 17', is dipped into an adhesive such as pitch P, dissolved in a solvent as petrol, for example. This plug is elevated and upon engaging the bottoms of the trays internally coats them around the respective perforations with an adhesive layer such as 18 seen in FIG. 4. During this coating step, the strip tray bearing 11' is held in place by appropriate holders (not illustrated) and a counter-plate 19 as seen in FIG. 3.

This coating of the perforated trays T' with adhesive is preferably effected at the speed of the conveyed strip to avoid accumulation of strip lengths between two consecutive stations.

Such a coating requires the use of a relatively fluid adhesive and, therefore, a strip after having been coated cannot be used immediately. It must be allowed to rest for a few hours so that the solvent can evaporate at least partially. Preferably, this is done by winding to strip bearing coated trays upon a roller or reel and temporary storage thereon.

When the adhesive has sufficiently solidified, the roller on which the strip has been wound and stored moves to the next stage of treatment where it is unrolled, openings of trays being directed upwardly. Then coated and perforated trays T'' are filled with the constituents of the cells. Successively, as shown in the exploded view of FIG. 5 for a tray T'' number one:

First, a duplex electrode with dimensions inferior to that of the tray into which it is to be centered by mechanical means is mounted in the tray T''. This electrode is constituted by a zinc plate 21 whose lower face is coated with a conductive layer 22 on which the adhesive 18 previously applied over the bottom of the tray T'' adheres preventing electrolyte from intercell leakage, and so ensuring intercell sealing.

Then, a separator 23 of a square sheet of paper previously impregnated with electrolyte and then dried and having dimensions corresponding to those of the tray above the duplex electrodes and thus larger than the zinc plate 21 is mounted over the uncoated face of said plate 21.

The duplex electrodes and the separator are preferably cut off successively from very long strips all of a suitable width so that no waste is possible. After severance, they are transferred and deposited inside the tray T'' as by pneumatic means. Since zinc plate 21 is of smaller dimensions than the bottom of the tray T'', the separator can be constituted by a flat piece instead of being shaped as a hollow part with turned-up edges because no direct contact can occur even accidentally between the zinc plate and the depolarizer mix owing to the fact that the zinc plate is centered and fixed to the bottom of the tray T'' by the adhesive 18.

Then, a depolarizer mix 24 impregnated with electrolyte and severed in an appropriate shape from a strip of compressed mix is deposited in the tray T'' over the separator 23 as by using a kind of core-catcher ensuring its transfer into the tray T''.

The strip 11' further conveys the trays now filled with the cell constituents and in a following step (not illustrated) the filled trays T'' are inserted into corresponding apertures arranged in an endless belt, wherein they are maintaineed and transferred to a severing device such as a saw located just beneath the belt in order to separate individual trays T'' from the strip.

The severed individual trays drop on a plate beneath the saw and are transferred thereby to the next operational position which is stacking of filled trays T''.

Figure 6:
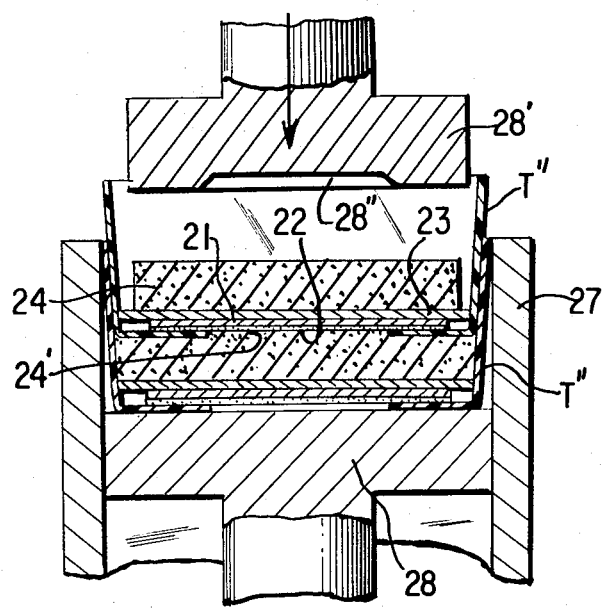
FIG. 6 is a fragmentary cross-section diagrammatically illustrating how to stack and then individually compress the cells initially.

This stacking is effected in such a way that the individual cells formed by filled trays are series-connected as is seen in FIG. 6 wherein a tubular form 27 having dimensions corresponding to those of the filled trays T'' is provided and in which a lower piston 28 can move.

When no downward pressure is exerted on the piston 28 it is kept in balance in any position inside the form 27 in which it can move by friction. Such friction provides a braking action and an inertia effect against its displacements subsequent to the introduction of trays T'' filled with their constituents during the stacking operation.

In FIG. 6, two filled cell trays T'' are shown nested in each other. Before introducing the second tray, the lower cell tray has already been automatically placed in the form 27 and has had its constituents compressed by a downward movement of the upper piston 28' so that the piston 28 also is pushed down allowing the introduction of the second tray into the one already encased in the form 27. The second cell tray is then compressed in turn by the piston 28' as shown upon its moving downwards. The compression exerted by the piston 28' on each successive cell tray introduced into the form 27 effectively brings the individual constituents of each cell tray nearer together, so promoting satisfactory electrochemical operation and in addition securing efficacious series-connection of the cells. In fact, during this compression the upper piston 28' whose bottom face has an appropriate hollow shape 28'' provides the mix with a central boss 24' which will lodge in the perforation of the bottom of the next following tray superposed on it.

In this way, the conductive coating 22 on the bottom face of each duplex electrode of each cell is effectively in contact with the depolarizer mix 24 of the next preceding cell, and this ensures good electrical series connection between adjacent cells.

When a specified number of filled trays has been piled up to form a stack successively compressed during piling, the piston 28 is elevated to permit the removal of the stack from the form 27 so that a terminal applying operation can follow and a special tray provided with the positive terminal is mounted in the top tray of the stack.

Another tray fitted with the negative terminal is mounted at the bottom of the lowermost filled tray T'' of the stack. These negative and positive terminals are shown with their special trays T''' and $T^{iv}$ in FIGS. 7 and 8 respectively.

Figure 7:
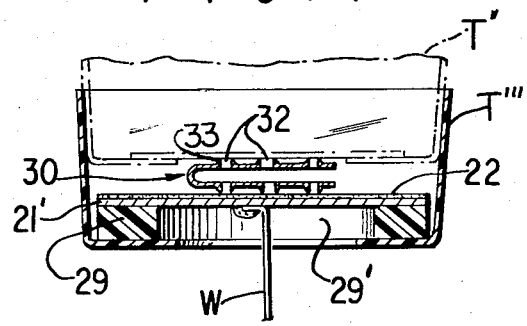
FIGS. 7 and 8 are cross-sections at opposite ends of the stacked cells showing application thereto of terminals of a battery according to the invention.

As seen in FIG. 7, the negative or lower terminal is constituted by a tray T''' in which is positioned a plastic frame 29 defining a space 29' between the bottom of the tray T''' and the zinc sheet 21 of a duplex electrode, permitting completion of correct stacking notwithstanding the presence of a U-shaped metal part 30 provided with small slots such as 32 on both legs. The rims of these slots, on the external sides of the U-legs, bear burrs 33 capable of penetrating the conductive layer 22 of the duplex electrode 21 in the tray T'' just above tray T'''.

In this manner, the negative terminal can simply be completed by welding a wire W to the zinc sheet 21 which appears in tray T''' through the open frame 29 and then by pouring wax or other sealing compound in the empty volume 29.

Figure 8:
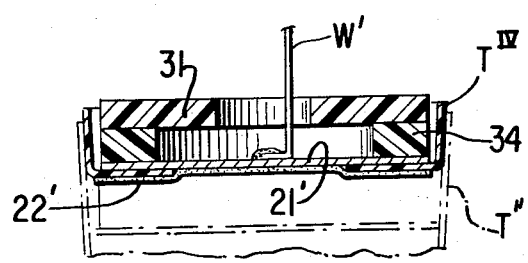

The positive terminal shown in FIG. 8 comprises a perforated tray $T^{iv}$ having a height inferior to that of the trays T'', in which is placed a zinc plate 21' held in place by means of a sheet of conductive coating 22' applied to the external side of the bottom of the tray $T^{iv}$.

In this tray $T^{iv}$ above, the zinc plate 21' a square piece 31 of insulating material such as cardboard, perforated in its middle is positioned and adhered to a frame part 34. The thickness of this assembly is such that it projects substantially beyond the upper edges of the tray $T^{iv}$, i.e. above the upper edge of the tray T'' containing cell constituents located directly below tray $T^{iv}$, since these two edges are nearly at the same level. This arrangement permits final compression efficiently of the assembly of piled trays T'', T''' and $T^{iv}$.

After the stack assembly has been fitted with both terminals, it is then submitted to a global compression of a few kg./cm.$^2$ approximately. The side walls of all trays and external parts of end surfaces are then coated with several layers of wax or paraffin in order:

to insure sealing between individual cells in superposed trays T'';
to confer more rigidity to the stack,
to protect all the trays against the attack of a solvent during further manufacturing procedure, such protection being absolutely necessary when the trays are made of polystyrene.

Thereafter, as a next step, the coated battery assembly is submitted to a final compression which serves to bring its dimensions to definitive values. According to the invention, the process for effecting this compression comprises as a first stage utilization of the elasticity of a sheath made of a plastic material of smaller dimensions than the assembly which is over-stretched to permit introduction of a battery assembly into it and released from stretch thereafter so that it contracts over the assembly and, a second step, to deplastify the sheath already tightened and contracted around the stack, so that the diameter and length of the sheath further contract and hardens or sets to maintain the stack assembly and all its components in a definitive state of permanent compression.

The advantage of such a sheathing procedure is to provide an individual compression of those cells in the stack and may be effected for example by the following manner as is illustrated in FIG. 9.

A flexible plastic tube 37, for example, of plasticised polyvinyl chloride is cut to desired length and closed at one end 38 as by welding. The diameter of this tube 37 is initially smaller than that of a battery assembly so that the latter cannot be introduced directly into it until it has been stretched. This operation is effected by means of a tubular form 39 provided with an upper opening whose external walls 40 are cone-shaped and over which a clamping ring 41 can be slipped. The plastic tube 37 is first dipped in a solvent such as trichloroethylene and its open end is then forced over the conical wall 40 and then clamped in place by the ring 41. Any other suitable plastic that is stretchable and subject to additional contraction by treatment with a suitable deplastifying agent may be used for tube 37.

Then vacuum is created inside the tubular form 39 via its bottom opening 39' so that the part of the tube 37 outside the form 39 inverts or reverses itself and enters into close stretched contact with the inner walls of the form 39, which has dimensions that are slightly larger than those of the battery assembly stack (this reversed position is shown by dotted line 37'). As a result of the inversion and stretching of tube 37 to condition 37', the battery assembly can easily be introduced in the stretched tube 37' in tubular form. Then, when vacuum is broken at the lower opening 39' of tubular form 39 and ring 39 removed, the sheath 37' contracts and its sheath closes around the inserted battery assembly and compresses it and its constituents 41. This operation can be very quickly performed before the deplastification resulting from the aforesaid dipping in solvent of tube 37 occurs. Then the two ends of the tube can be welded as by high frequency electric fields to shut the sheath at both ends of the confined assembly.

When the plastic sheath or tube 37 contracts and shrinks back, the portions of the tray walls projecting higher, the mix in each respective nested tray are pressed against the external tray sides adjacent the bottom of the next upper tray.

This compression effect of sheath 37 in itself could be sufficient to ensure intercell sealing in the assembly; however, it is advantageous to combine this effect with the previous coating of wax or paraffin applied to the assembly to improve sealing reliability.

On the other hand, when the tube or sheath 37 shrinks initially as a result of stretch release, its ends fold over the upper and lower ends of the assembly so that longitudinal contraction of the sheath also causes a compression of the assembly which proceeds from cell to cell since the sheath engages also the flanged rims of the trays. The second contraction of the sheath resulting from solvent evaporation emphasizes this effect. Thus, the overall global contraction effected by the sheath is the result of the sum of its partial contractions and engagement at the rims of piled trays effected by sheath 37.

A completed battery B comprising a stack of trays and cells with shrunk-on or contracted outer sheath 37 applied as herein described is illustrated diagrammatically on an exaggerated scale in FIG. 10.

While the procedure herein described has been with reference to preparation of a primary battery with trays and duplex zinc electrodes, it can be applied to any type of electrochemical generator using tray filled cells wherein the zinc duplex electrodes are replaced by other duplex electrode structure comprising other active materials such as silver oxide, copper oxide, magnesium, aluminum, mercury oxide, cadmium hydroxide and other cell components. The term electrochemical generator or battery utilized herein is intended to embrace all such types of tray cells utilizing duplex electrode structure assembled and encased in a shrunk-on sheath applied in the manner herein described.

While specific embodiments of the invention have been presented herein, variations within the scope of the appended claims are possible and are contemplated. There is no intention, therefore, of limitation to the exact abstract or disclosure herein made.

What is claimed is:

1. A process for mass production of batteries embodying piled flat constituents in stacks of superposed nested trays comprising providing a strip of plastic material, simultaneously forming a plurality of like trays in said strip, perforating the center portions of the bottoms of said trays in the strip leaving marginal portions around the perforations, coating the marginal portions of the bottoms of these perforated trays internally only adjacent the perforations and about the internal peripheries thereof with adhesive, subsequently introducing cell-forming constituents into each of said trays to fill them, said constituents comprising a duplex electrode whose lower face has a conductive coating and whose areal dimensions are inferior to those of the bottom of the tray, a separator whose areal dimensions are slightly in excess of those of the duplex electrode, and a depolarizer mix, the conductive coating of said duplex electrode being adhered directly to said adhesive on said marginal portions and also being exposed in the perforation of the respective tray, said constituents being deposited in the order named for filling each tray, severing individual filled trays from the strip, stacking with a first individual compression of constituents of each successive one of a selected number of such filled trays in superposed nested relationship to form a battery assembly, and during said individual compression of the constituents of each filled tray forming a boss on the depolarizing mix thereof to permit its lodgement in the perforation of the immediate superposed filled tray, effecting global compression of the assembly of stacked filled trays by enclosing the assembly within an initially distended external sheath, allowing said sheath to contract longitudinally and laterally about said assembly to provide a shrunk-on external sheath whose contraction longitudinally and laterally effects final longitudinal and lateral compression on the individual trays and their constituents in the assembly.

2. A process according to claim 1, wherein said strip is initially preheated and predrawn prior to tray formation therein.

3. A process according to claim 2 wherein the predrawing of said sheet prior to tray formation is effected by air pressure while said sheet is heated.

4. A process according to claim 3, wherein tray formation after predrawing of said sheet is effected by use of vacuum created after heating and predrawing of said sheet has been completed, said vacuum serving to then draw the sheet over tray-shaping members.

5. A process according to claim 1, wherein said first-named coating is applied by an element dipped into a dissolved adhesive which is introduced into the perforated bottoms of the trays.

6. A process according to claim 1, wherein said external sheath is initially of smaller dimensions than the assembly and is overstretched prior to insertion into it of said assembly and thereafter released from overstretched condition so that it contracts about the assembly.

7. A process according to claim 6, wherein said external sheath is of plastic material into which said assembly is inserted, has a deplastifying agent applied to it to cause its further contraction about the assembly upon evaporation of the said agent.

8. A process according to claim 7, wherein said external sheath of plastic material has said deplastifying agent applied to it prior to insertion into it of said assembly.

9. A process according to claim 1, wherein said external sheath is of plasticized polyvinyl chloride.

10. A process according to claim 9, wherein said plasticized polyvinylchloride sheath has a deplastifying agent applied thereto which provides partial contraction of said sheath about the assembly inserted into it.

11. A process according to claim 10, wherein said agent is trichloroethylene.

12. A process according to claim 1 including the step of applying a sealing coating to the external surface of the assembly prior to effecting said global compression.

References Cited

UNITED STATES PATENTS

| 2,536,697 | 1/1951 | Ruben | 136—111 |
| 2,671,125 | 3/1954 | Heraud | 136—132 |
| 2,834,827 | 5/1958 | Emeriat | 136—111 |
| 2,865,976 | 12/1958 | Jammet | 136—111 |
| 3,440,105 | 4/1969 | Yamamoto et al. | 136—108 |

FOREIGN PATENTS

| 1,252,174 | 12/1960 | France | 136—175 |

ANTHONY SKAPARS, Primary Examiner

U.S. Cl. X.R.

136—111, 132